Aug. 13, 1957  I. H. POLK  2,802,341
METHOD AND APPARATUS FOR COOLING PRODUCTS
Filed Aug. 17, 1953
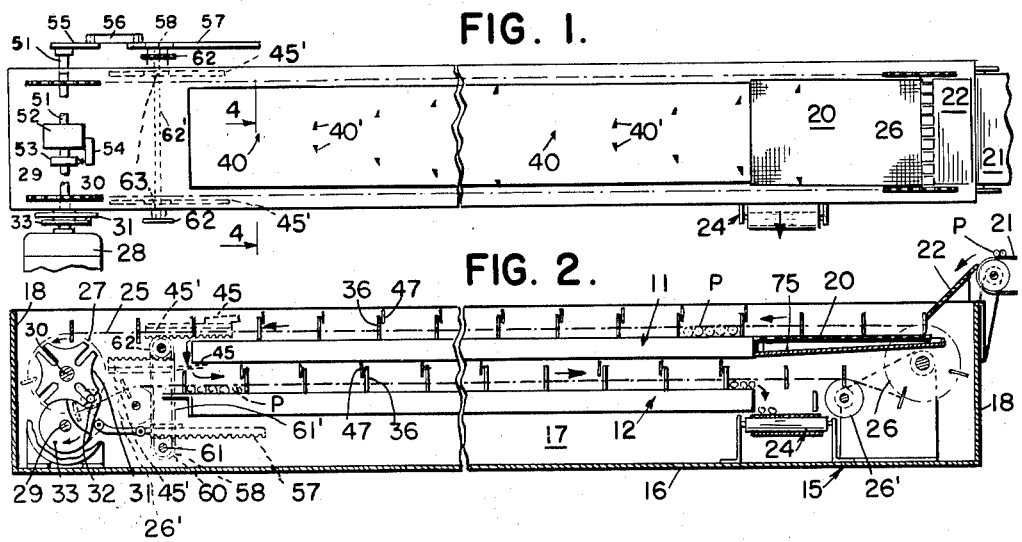
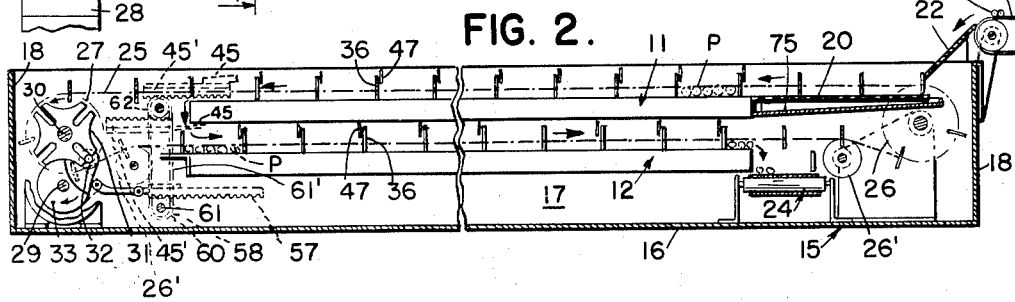
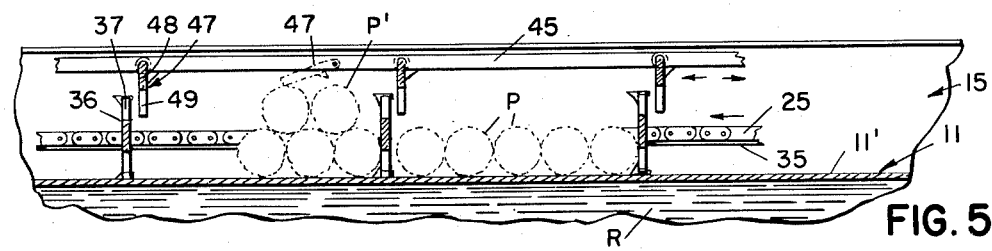
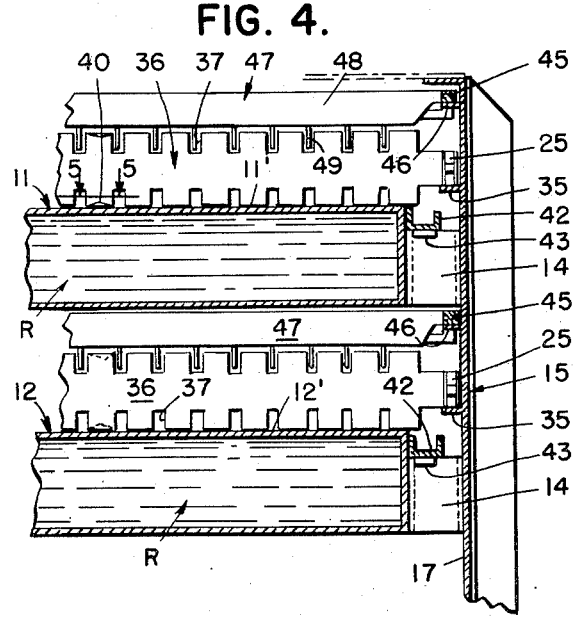
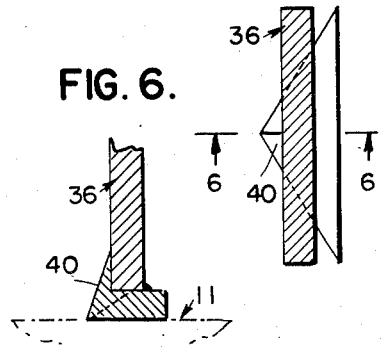
INVENTOR
ISAAC H. POLK
BY
Mason & Graham
ATTORNEYS

United States Patent Office 2,802,341
Patented Aug. 13, 1957

2,802,341

METHOD AND APPARATUS FOR COOLING PRODUCTS

Isaac H. Polk, San Jose, Calif., assignor of five percent to William R. Graham and five percent to Collins Mason, both of Los Angeles, Calif.

Application August 17, 1953, Serial No. 374,487

6 Claims. (Cl. 62—114)

This invention has to do generally with the art of refrigeration and particularly with means for rapidly cooling various substances from a temperature many degrees above the freezing point of water to a temperature near or below the freezing point of water. The invention is particularly suited to and will be described in connection with the cooling of meat products.

One of the problems in the meat packing industry is that of rapidly cooling sausages and other meat products as they come from the cooker at a high temperature to a temperature at which the produce can be packed without dehydrating or shrinking the product.

Therefore, one of the objects of the invention is to provide a method of and apparatus for rapidly cooling unpackaged products, particularly meat products, to avoid dehydration and shrinkage resulting from other methods of cooling with which I am familiar. It is a particular object of my invention to provide a novel method and apparatus for accomplishing this by conduction.

Another object is to provide apparatus for cooling products of the type indicated which includes a refrigerated surface and novel means for distributing and redistributing the products to be cooled over the surface.

A further object is to provide in apparatus of the type indicated means for progressively moving the products over the refrigerated surface.

Still another object of the invention is to provide apparatus of the general type indicated in which means are provided for removing grease from the refrigerated plates.

A particular object is to provide apparatus for cooling products having a shape such that only a small percentage of the surface area thereof can be brought into contact with a refrigerated surface at any time.

Another object is to provide apparatus of the type indicated in which means are provided for intermittently changing the line of contact between the products being cooled and the refrigerated surfaces.

Still another object is to provide apparatus embodying two or more refrigerated plates over which the product is moved and to provide a construction which enables the accomplishment of the above objects and yet enables the close spacing of the plates to secure maximum cooling by the transfer of heat by radiation from the product to the plates in addition to cooling by conduction.

Another object is to provide apparatus in which the product is intermittently, progressively moved over a refrigerated surface and in which the product, or a portion thereof, is redistributed over the surface between periods of progressive movement.

These and other objects will be apparent from the drawing and the following description.

Referring to the drawing:

Fig. 1 is a plan view, largely diagrammatic, illustrating an apparatus embodying the invention;

Fig. 2 is a longitudinal sectional view, also largely diagrammatic, through the apparatus of Fig. 1;

Fig. 3 is a fragmentary longitudinal sectional view on an enlarged scale showing a portion of the apparatus for progressively moving the product and for redistributing the product;

Fig. 4 is a greatly enlarged fragmentary cross-sectional view in the plane of line 4—4 of Fig. 1;

Fig. 5 is an enlarged sectional plan view on line 5—5 of Fig. 4 showing a portion of one of the flight members with a degreasing lug thereon; and Fig. 6 is a fragmentary sectional view on line 6—6 of Fig. 5.

More particularly describing the invention, for purposes of illustration, I show two refrigerated, hollow plates 11 and 12, the upper surfaces 11' and 12' respectively of which support the product or product elements P to be cooled. The plates are disposed in parallel, vertically spaced relation and can be supported in any desired manner, as upon suitable brackets 14 attached to an encasement means and frame structure 15. The latter has a lower wall 16, side walls 17, and end walls 18. Any conventional means may be used for circulating refrigerant R through the plates. At one end of the upper plate I show a screen 20 forming a prolongation of the upper surface of plate 11 upon which the product, such as sausages, are deposited by a conveyor 21 which may be assumed to come from the cooker, the product falling by gravity down an incline 22.

In carrying out the invention, I progressively move the product over the upper plate and then over the lower plate after which the product is discharged upon a conveyor 24. Also, during this progressive intermittent movement of the product over the plates and thereafter, I redistribute the product in such a way as to insure the individual product elements being brought into contact with the plate surface in a changed position thereby providing a new area of contact between the elements and the refrigerated surface. In this connection I wish to point out that my method and apparatus are particularly designed for use in cooling product elements which do not have planar surfaces, or which have planar surfaces which individually are of small areal extent relative to the entire surface area. Sausages are one example.

For the purpose of moving the product over the plates I provide a conveyor means which includes two chains 25 which pass about suitable chain-supporting sprockets 26 and 27 and guide sprockets 26'. The chains are supported intermediate the latter upon tracks 35 formed on the inner surface of the side walls 17 of the encasement structure.

The chains are intermittently moved in the direction of the arrows by motor 28 having a drive shaft 29 through the medium of Geneva wheel means 31 and 32 which intermittently rotates shaft 30 carrying drive sprockets 27. The motor may be considered to have integral gearing to achieve a very slow speed rotation of the drive shaft 29. I prefer to have the product remain at rest for a considerably longer time than that required to advance the product, and it may be advisable to provide other motivation means to accomplish a more rapid movement of the product and a relatively longer period of rest.

At regularly spaced intervals I provide flight members 36 which extend between the chains, being secured thereto at their ends in any suitable manner. Thus, while the flight members are shown disposed in planes normal to the surfaces of the plates, I contemplate that they may be adjustably mounted on the chains to permit of their being set at a desired angle with relation to the plate surfaces as may be desired in the handling of certain types of products.

The flight members are shown as being provided with marginal recesses 37 for a purpose which will later be described. The flight members may be provided with degreasing lugs or scrapers 40, and these would be arranged as sketchily shown in plan view in Fig. 1 so that as the flights move over the surface of a plate they will tend to remove the grease therefrom and deflect it outwardly to deposit the grease in troughs 42 located at the lateral margins of the plates. The troughs may be heated by any suitable heaters 43 to enable the grease to flow by gravity to any suitable collection means.

One feature of the invention is that by intermittently moving the product elements I thereby change the contact area of the elements with the plates with consequent increase in efficiency of heat transfer. I also provide means to prevent piling up of the product as may result from the forward movement thereof. This means comprises a pair of reciprocably mounted bars 45 for each plate, the bars being supported upon suitable guides 46. Extending between the bars are a plurality of rake members 47 which include a bar section 48 and a plurality of depending tines 49. The rake members are pivotally mounted for forward pivotal movement with respect to the direction of travel of the flight members thereby enabling them to assume retracted positions, such as that shown in broken lines in Fig. 3 when the product is moved forwardly. The tines 49 are so disposed as to freely enter the recesses 37 in the edges of the flight members.

The bars 45 can be reciprocated in any suitable manner after each movement of the flight members 36. By way of illustration I show the bars provided with rack extensions 45'. Drive shaft 29 of motor 28 extends into a combined clutch and gearbox means 52 having an output shaft 51, the latter preferably being driven faster than shaft 29. A cam 53 on shaft 29 actuates a switch 54 serving to engage the clutch of the means 52 for one revolution of the output shaft. This rotates a crank 55 connected by link 56 to a rack 57. The latter engages a pinion 58 connected to a pair of sprockets 60 keyed to shaft 61. Chains 61' pass around sprockets 62, the latter on shaft 62'. Pinions 63 on shaft 62' engage the respective racks 45' at the ends of the bars 45.

In the operation of the rake members, assuming that the product has been moved forwardly and may have piled up to some extent as shown in Fig. 3, the bars 45 are then moved forwardly or to the left in Fig. 3 for a distance of approximately the same as the distance between flight members, and thus carry forward, superimposed product pieces such as those shown at P' in Fig. 3 to redistribute them onto the surface of the plate. The rake members then return to their original position.

In its broader aspect, in my method I support the product elements on a refrigerated surface and intermittently redistribute the priduct elements or change the relation of the individual product elements to the surface. In carrying out my method I also prefer to progressively move the product over the surface of a refrigerated plate in the interest of continuity of production. The product should be moved a short distance and then allowed to remain at rest for a comparatively longer time. Also, preferably after each such movement I move any superimposed product elements to a position where they are in contact with the refrigerated surface.

In the operation of the apparatus the product is delivered hot onto the screen 20 through which excess grease drains into a trough 75 therebelow. The product is moved forwardly over the screen and the upper surface of the upper plate 11 by the flight members 36. This movement is intermittent so that between each period of movement the individual product elements are at rest for a considerably longer period of time than the time consumed in movement. After each movement the rack bars 45 are reciprocated to cause the rake members 47 to move any superimposed product elements P' off of the product elements thereunder and onto the surface of the plate. The product is thus progressively moved over the upper plate from right to left and falls by gravity from the upper plate onto the lower plate. The product is there picked up and progressively moved from left to right over the upper surface of the lower plate by the flight members 36, which are now inverted in respect to their original position, to the end of the plate where it falls by gravity onto the conveyor 24. During movement of the flight members the scrapers 40 serve to remove grease from the surfaces of the plates and deflect this outwardly to the troughs 42.

It will be apparent that the method and apparatus described accomplishes the objects hereinabove set forth. While I have shown and described a particular form of apparatus for carrying out my invention, I contemplate that many and various changes can be made in the apparatus without departing from the invention, the scope of which is indicated by the claims.

I claim:

1. The method of rapidly cooling product elements of the type indicated using a refrigerated surface which comprises the steps of supporting the product elements on the refrigerated surface, intermittently reorienting the elements on the surface to establish different area contact between the elements and the surface by causing relative movement between the product elements and the surface, and following each said relative movement, moving any superimposed product elements to position the same directly on said surface.

2. In apparatus of the type described, means providing a refrigerated surface disposed to support product elements to be cooled, means for moving said product elements over said surface including a plurality of laterally spaced, product element-engaging flight members extending across said surface connected for simultaneous movement, means for imparting intermittent movement to said flight members, a plurality of laterally spaced product rake members spaced above said surface and extending thereacross in the same direction as said flight members, and means for imparting limited reciprocal movement to said rake members.

3. Apparatus as defined in claim 2 in which said rake members are retractable relative to said surface.

4. Apparatus as defined in claim 2 in which said flight members and said rake members are positioned to overlap and are formed to freely intermesh in the region of said overlap whereby to permit of relative movement one past the other.

5. In apparatus of the type described, means providing a refrigerated surface disposed to support product elements to be cooled, a plurality of movably mounted laterally spaced product element-engaging flight members extending across said surface, a plurality of movably mounted laterally spaced product element rake members spaced above said surface and extending thereacross in the same direction as said flight members, and means for intermittently moving said flight members as a unit and for reciprocating said rake members as a unit in timed relation to each other.

6. In apparatus of the type described, means providing a refrigerated surface disposed to support product elements to be cooled, product element-engaging means for moving the product elements relative to said surface, rake members mounted independently of said product-engaging means for engaging superimposed product elements, and power means for intermittently moving said product element-engaging means and said rake members in timed relation to each other.

References Cited in the file of this patent
UNITED STATES PATENTS

| | | |
|---|---|---|
| 1,133,817 | Power | Mar. 30, 1915 |
| 1,822,077 | Birdseye | Sept. 8, 1931 |
| 1,891,425 | Kronquest | Dec. 20, 1932 |
| 1,944,857 | Atwell | Jan. 23, 1934 |
| 1,980,571 | Brach | Nov. 13, 1934 |

(Other references on following page)

UNITED STATES PATENTS

| | | |
|---|---|---|
| 1,998,431 | Birdseye | Apr. 23, 1935 |
| 2,026,214 | Chilton | Dec. 31, 1935 |
| 2,026,227 | Foraker | Dec. 31, 1935 |
| 2,077,608 | Wood | Apr. 20, 1937 |
| 2,212,472 | Hartmann | Aug. 20, 1940 |
| 2,229,000 | Birdseye | Jan. 14, 1941 |
| 2,242,527 | Knowles | May 20, 1941 |
| 2,318,736 | Birdseye | May 11, 1943 |
| 2,631,440 | Polk | Mar. 17, 1953 |

FOREIGN PATENTS

| | | |
|---|---|---|
| 459,522 | Germany | May 7, 1928 |